United States Patent [19]

Raidel

[11] Patent Number: 4,802,690
[45] Date of Patent: Feb. 7, 1989

[54] SUSPENSION ASSEMBLY FOR STEER AXLE WITH SINGLE AIR SPRING MOUNTED DIRECTLY OVER THE AXLE

[76] Inventor: John E. Raidel, Rte. 1, Box 400-M, Springfield, Mo. 65804

[21] Appl. No.: 20,490

[22] Filed: Mar. 2, 1987

Related U.S. Application Data

[63] Continuation-in-part of Ser. No. 929,634, Nov. 12, 1986, abandoned.

[51] Int. Cl.⁴ .............................................. B60G 11/28
[52] U.S. Cl. .................................................... 280/713
[58] Field of Search ............... 280/713, 711, 724, 712, 280/725, 688, 683, 689, 685

[56] References Cited

U.S. PATENT DOCUMENTS

| | | | |
|---|---|---|---|
| 2,246,821 | 6/1941 | Utz | 280/724 |
| 2,941,817 | 6/1960 | Benson | 280/713 |
| 4,181,323 | 1/1980 | Raidel | 280/711 |
| 4,262,929 | 4/1981 | Pierce | 280/725 |
| 4,465,298 | 8/1984 | Raidel, Sr. | 280/713 |
| 4,465,300 | 8/1984 | Raidel, Sr. | 280/725 |

*Primary Examiner*—David M. Mitchell
*Assistant Examiner*—Karin Ferriter
*Attorney, Agent, or Firm*—Rogers, Howell, Moore & Haferkamp

[57] ABSTRACT

A suspension assembly for a steering axle wherein a fabricated axle seat is welded to a fabricated torque rod bracket, and torque rods arranged in a parallelogram are pivotally connected to the torque rod bracket. The end of a sway bar is also connected to the torque rod bracket to provide lateral stability. A single air spring is mounted directly over the axle. The torque rods are also pivotally supported by a hanger and hangers on opposite sides of the vehicle are connected together by a cross channel brace.

14 Claims, 6 Drawing Sheets

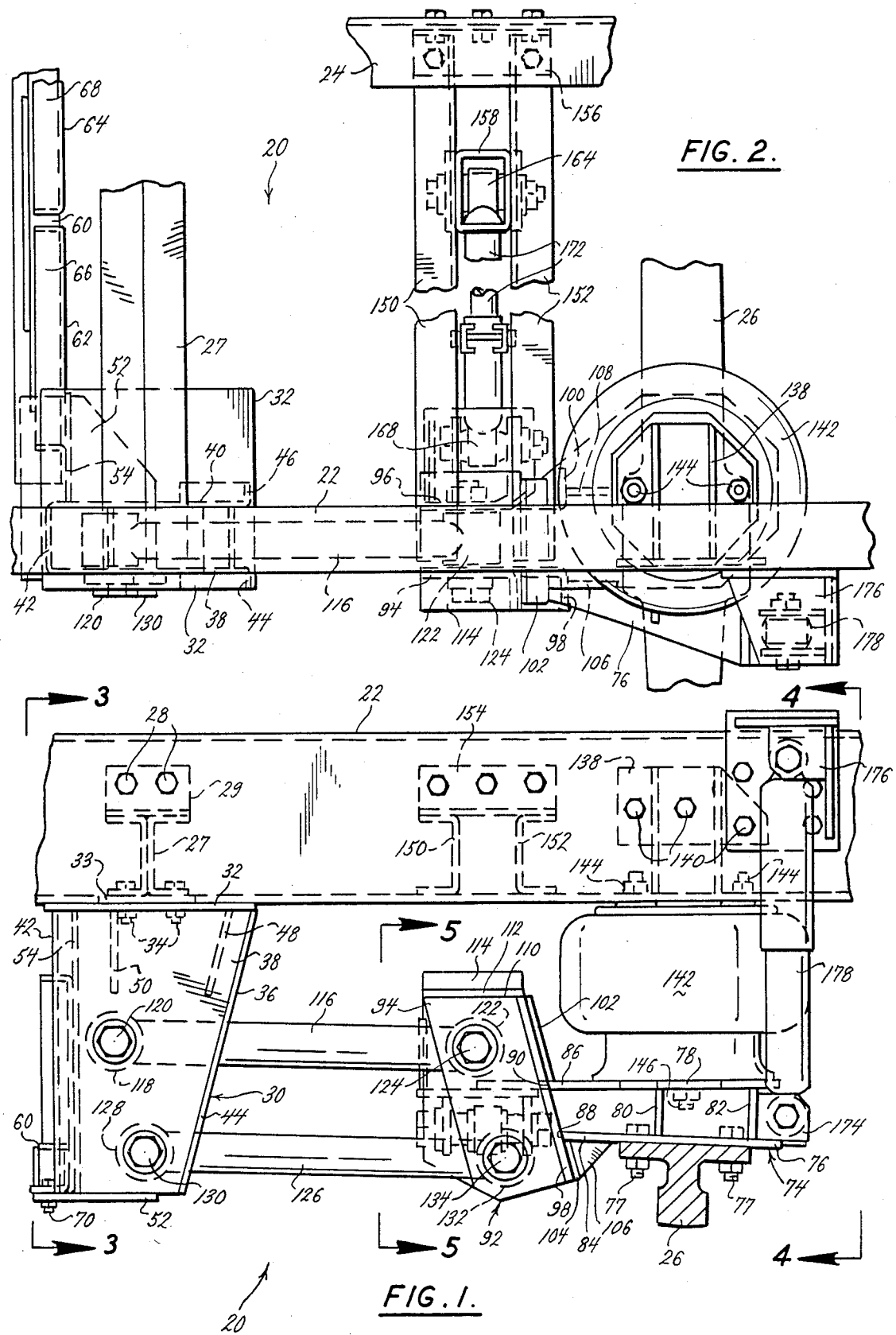

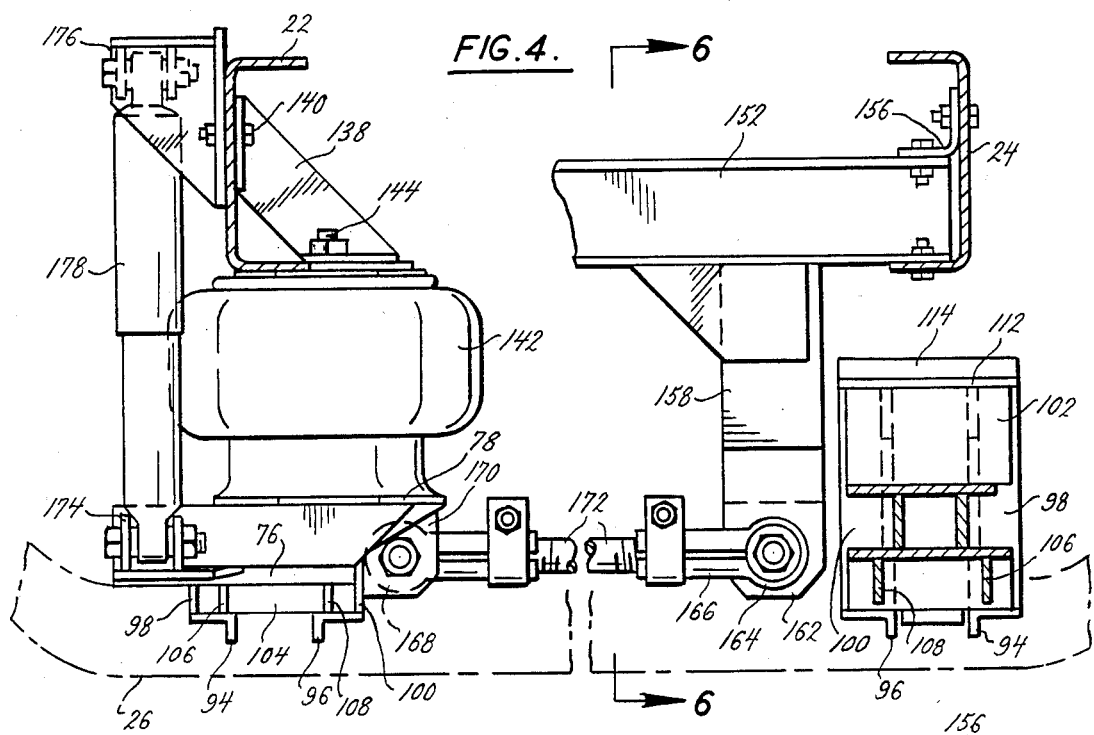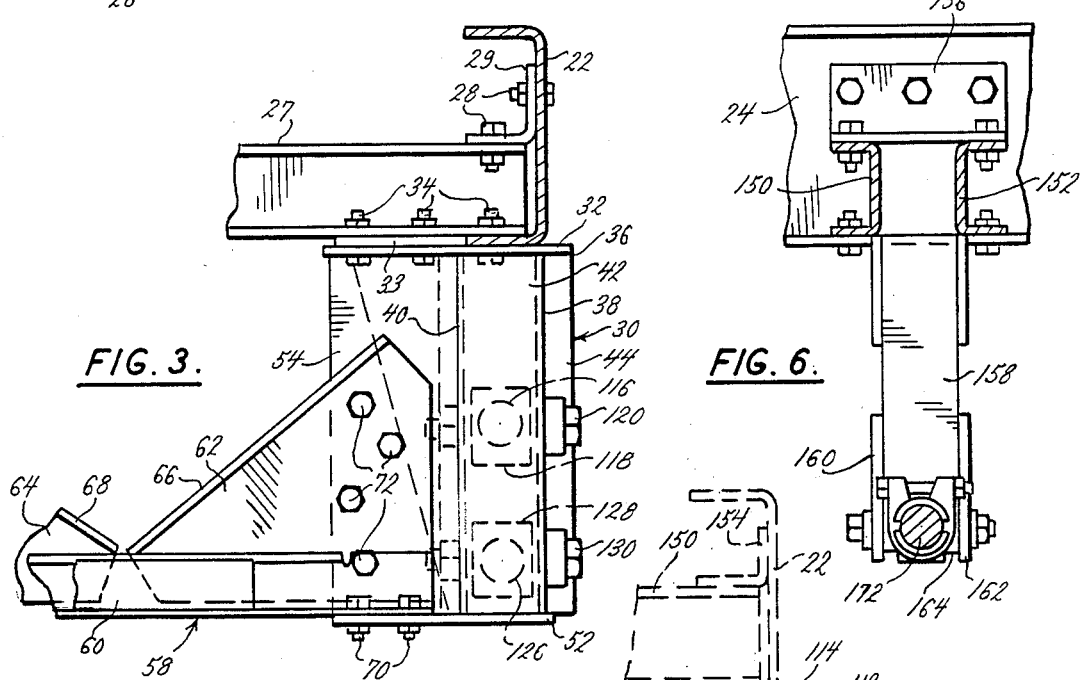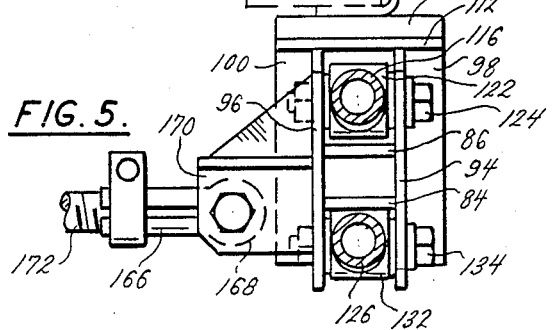

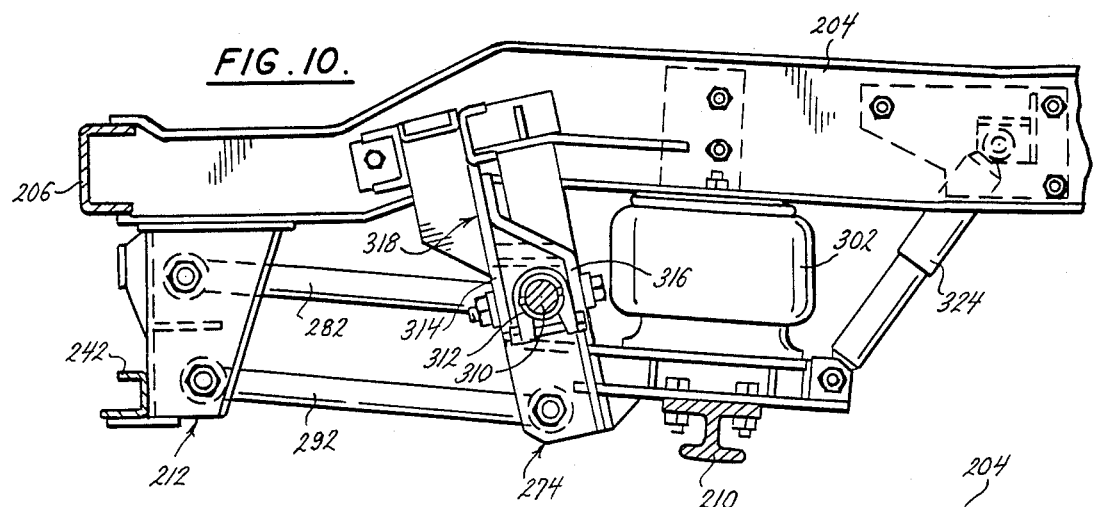
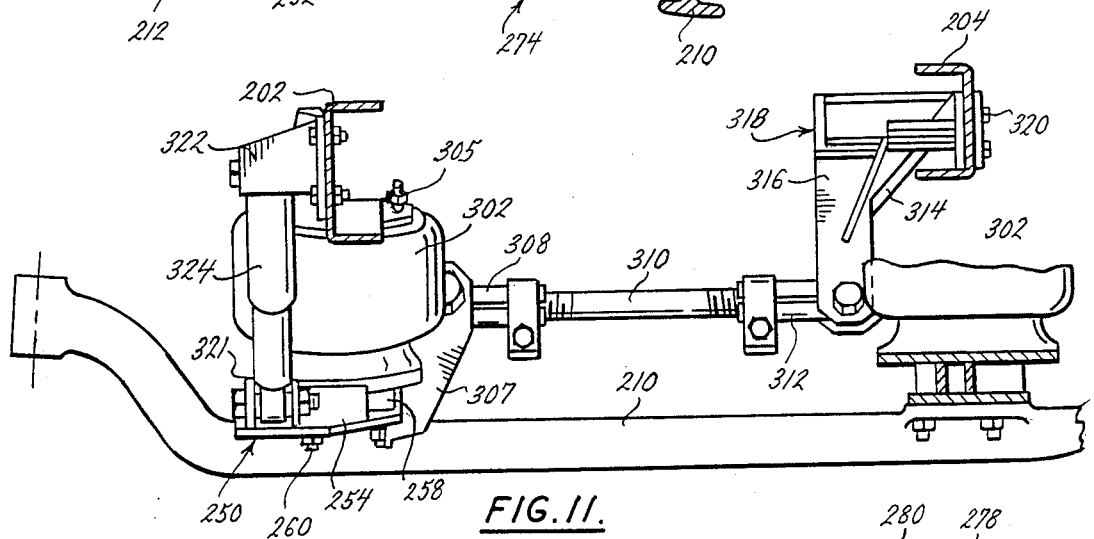
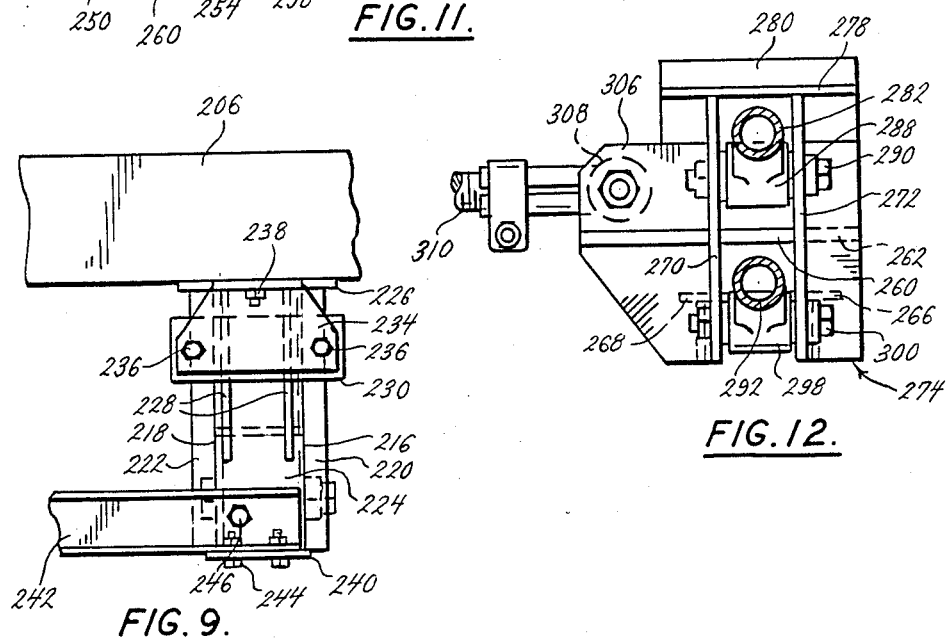

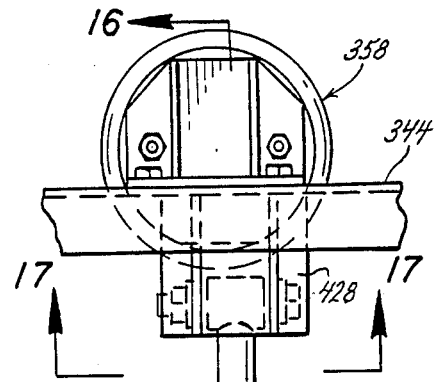
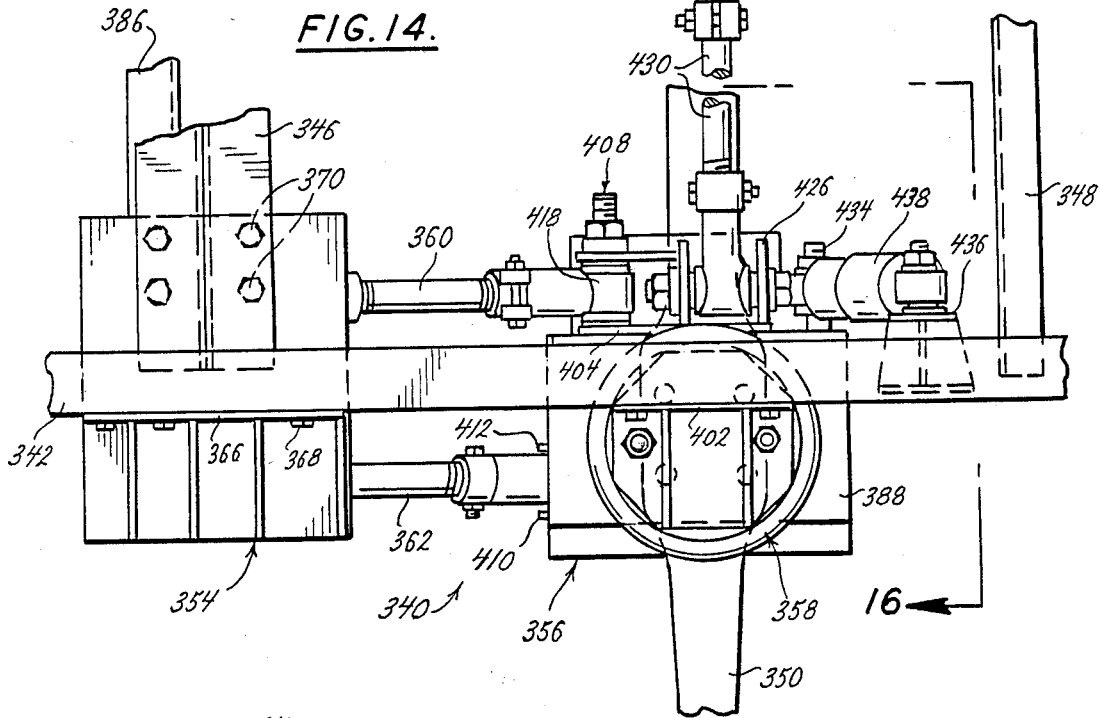
FIG.14.
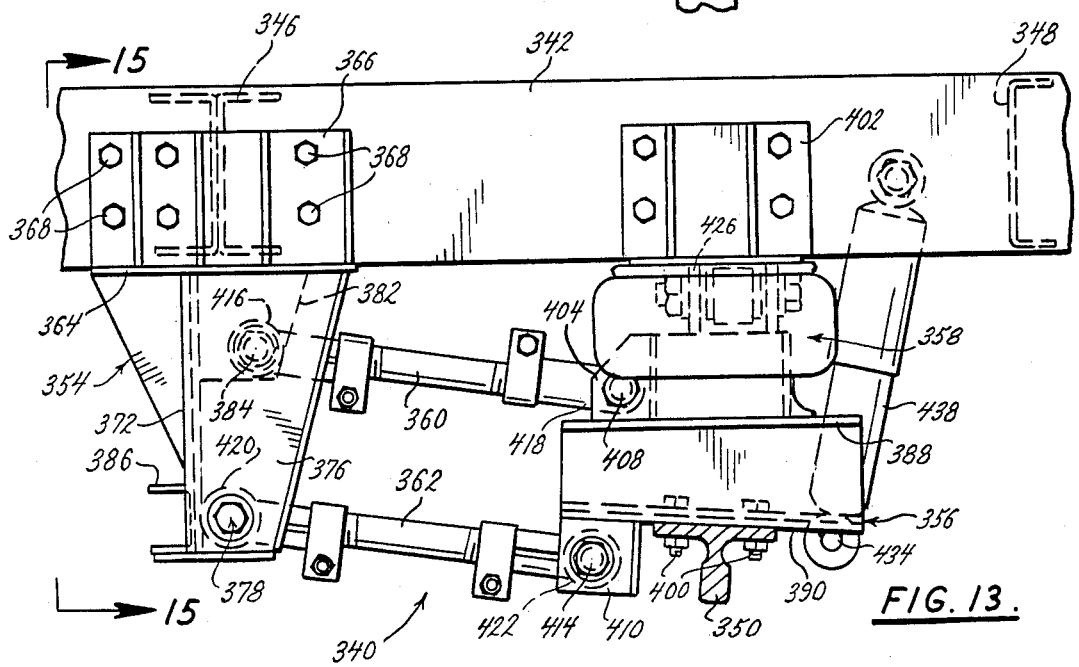
FIG.13.

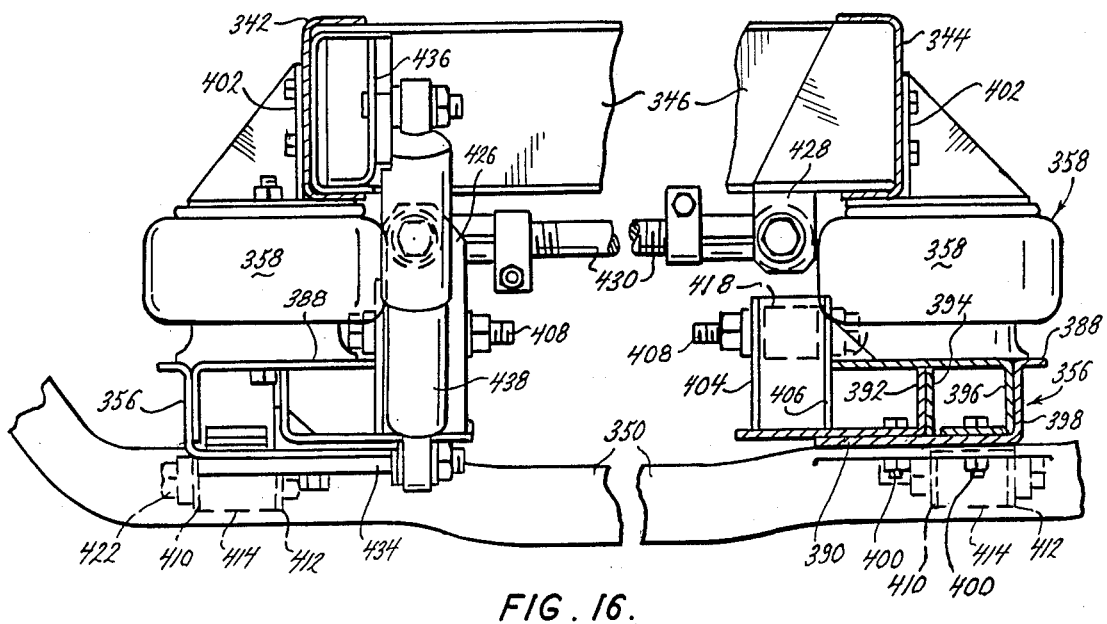
FIG. 16.
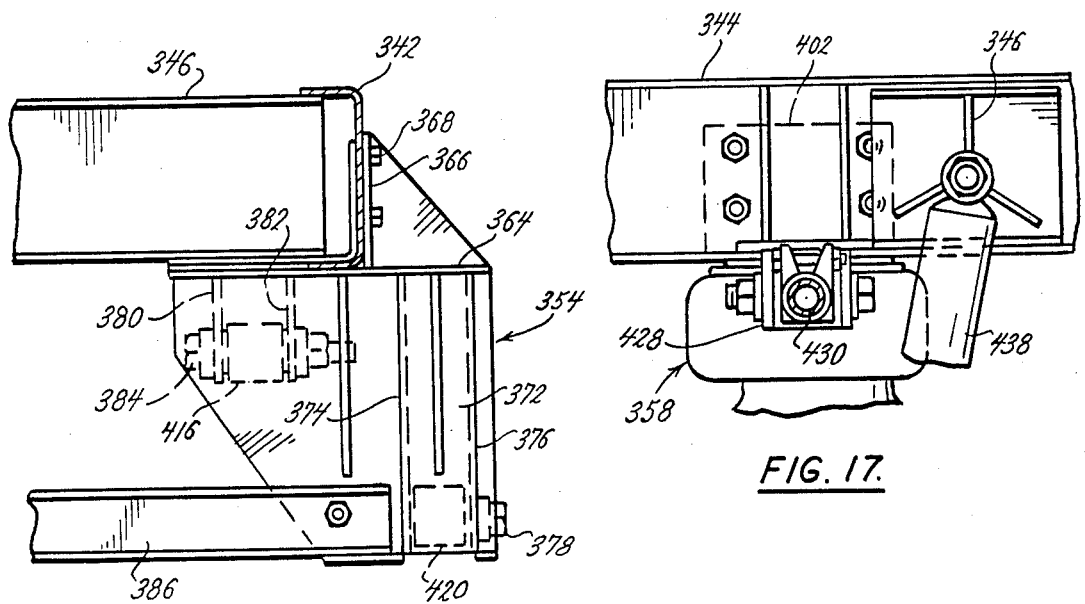
FIG. 15.
FIG. 17.

SUSPENSION ASSEMBLY FOR STEER AXLE WITH SINGLE AIR SPRING MOUNTED DIRECTLY OVER THE AXLE

BACKGROUND OF THE INVENTION

This invention relates to a vehicle suspension assembly for a steering axle and incorporates parallelogram torque rods mounted between a hanger and a bracket, the bracket being integral with an axle seat that also supports an air spring directly over the axle. The invention further includes a longitudinal parallelogram formed by transversely spaced torque rods. This application is a continuation-in-part of the inventor's prior application Ser. No. 06/929,634 filed Nov. 12, 1986 now abandoned.

A steering axle is subject to various lateral forces and stresses. For maximum comfort, it is desirable that an air spring suspension be as efficient as possible particularly considering the limited space available for the suspension. Accordingly, maximum lateral stability of the axle must be combined with maximum effectiveness of the air spring. Yet the suspension assembly should be readily removable for ease of repair or access to vehicle components.

These objectives are accomplished with a compact suspension assembly for a steering axle that incorporates a fabricated axle seat integral with a fabricated torque rod bracket. In one embodiment of the invention, a lower torque rod bracket projects downwardly from the axle seat and an upper torque rod bracket, spaced both above and inboard the lower bracket, projects upwardly from the axle seat. The upper torque rod, connected to the upper bracket, is spaced inboard of the lower torque rod. The two torque rods form a parallelogram in both a longitudinal direction and a transverse direction. In other embodiments, the torque rods form paralellograms, but are in the same vertical plane. The multi-purpose axle seat also incorporates brackets for connections of a sway bar and a shock absorber. Thus, a combination of components are connected to the axle seat assembly. The shock absorber is connected between the axle seat and the chassis. A single air spring is mounted between the axle seat and the vehicle chassis directly over the axle for maximum comfort.

In the two embodiments that have vertically aligned torque rods, the rear ends of the two torque rods are pivoted from the torque rod bracket on axes that define a forwardly slanted plane to make space for the air spring and allow its size to be varied. The forward ends of the torque rods are pivoted from a hanger on axes at the same slanted plane to maintain a true parallelogram configuration. On the other embodiment, the inboard spaced upper torque rod leaves a large enough area to accommodate a large air spring. The axle seat assembly also has an end of a sway bar connected to it, and the sway bar extends transversely for connection near the opposite side of the vehicle. Since the axle seat and the torque rod bracket are integral and since the axle seat is bolted to the axle, the sway bar provides lateral stability directly to the axle. In one embodiment, this stability is further improved because the connection of the sway bar to the torque rod bracket is close to the axle.

Further lateral strength is provided by a transversely extending cross channel assembly connected to the hanger and to a like hanger on the opposite side of the vehicle. Also, a transversely extending cross member is connected between the side rails of the vehicle chassis above the hanger.

Suspension systems have incorporated some of the structure of the present suspension but none incorporates the combination nor produces the results of this invention. The applicant acknowledges U.S. Pat. Nos. 4,529,224; 4,181,323 and 4,465,300, all of which disclose various torque rods arranged in parallelograms. However, as will be apparent, the present invention differs from the prior art in the combination of the components.

BRIEF SUMMARY OF THE INVENTION

This suspension system includes fabricated brackets that are welded to an axle seat, thereby becoming integral with the axle seat. The axle seat also has a top plate for mounting an air spring between it and the vehicle frame. The axle seat is bolted to the axle and the air spring is located directly over the axle. Two torque rods are pivotally mounted on a hanger that depends from the vehicle frame and are pivotally connected to the bracket. In one embodiment, the upper torque rod is inboard of the lower torque rod. In two other embodiments, the torque rods are aligned in a vertical plane and are connected to a bracket that is inclined to accommodate different sizes of air springs by creating space for them. However, the connections of the torque rods to the hanger are also on a parallel inclined plane so that a true parallelogram motion is retained.

In two embodiments, a bumper is mounted on the top of the torque rod connection bracket in the path of the rail frame member of the vehicle frame. The bumper allows the air spring to be constructed without an internal bumper and limits the upward travel of the axle and suspension parts. The bracket also provides a connection for an end of a sway bar assembly. The other end of the sway bar assembly is connected to a bracket that depends from a cross member or from the chassis at a transversely spaced location.

A cross channel assembly extends between the hangers on the two sides of the vehicle to provide reinforcement. A cross member is located over the hangers and extends between the left and right frame rail members.

The axle seat also provides a support for a bracket to which a shock absorber is connected. The other end of the shock absorber is connected to a bracket that is fastened to the rail frame member.

BRIEF DESCRIPTION OF THE DRAWINGS

FIG. 1 is a side elevation view of one embodiment of this suspension assembly;

FIG. 2 is a top plan view of the suspension assembly of FIG. 1 with parts broken away;

FIG. 3 is a view in section taken along the plane of the line 3—3 of FIG. 1;

FIG. 4 is a view in section taken along the plane of the line 4—4 of FIG. 1 with parts broken away and showing the right axle seat assembly in vertical section taken on a plane immediately forward of the air spring;

FIG. 5 is a view in section taken along the plane of the line 5—5 of FIG. 1 but showing the suspension components deflected upwardly with the bumper in contact with the vehicle frame, which is shown in dotted lines;

FIG. 6 is a view in section taken along the plane of the line 6—6 of FIG. 4;

FIG. 9 is a view in section taken along the plane of the line 9—9 of FIG. 7;

FIG. 10 is a view in section taken along the plane of the line 10—10 of FIG. 8;

FIG. 11 is a view in section taken along the plane of the line 11—11 of FIG. 7;

FIG. 12 is a view in section taken along the plane of the line 12—12 of FIG. 7;

FIG. 13 is a side elevation of a third embodiment of the invention;

FIG. 14 is a top plan view of the suspension assembly of FIG. 13;

FIG. 15 is a front elevation view of the suspension assembly of FIG. 13 as viewed along the plane of the line 15—15 of FIG. 13;

FIG. 16 is a view in section taken along the plane of the line 16—16 of FIG. 14; and FIG. 17 is a view in section taken along the plane of the line 17—17 of FIG. 14.

DETAILED DESCRIPTION OF PREFERRED EMBODIMENTS

Figure 8:
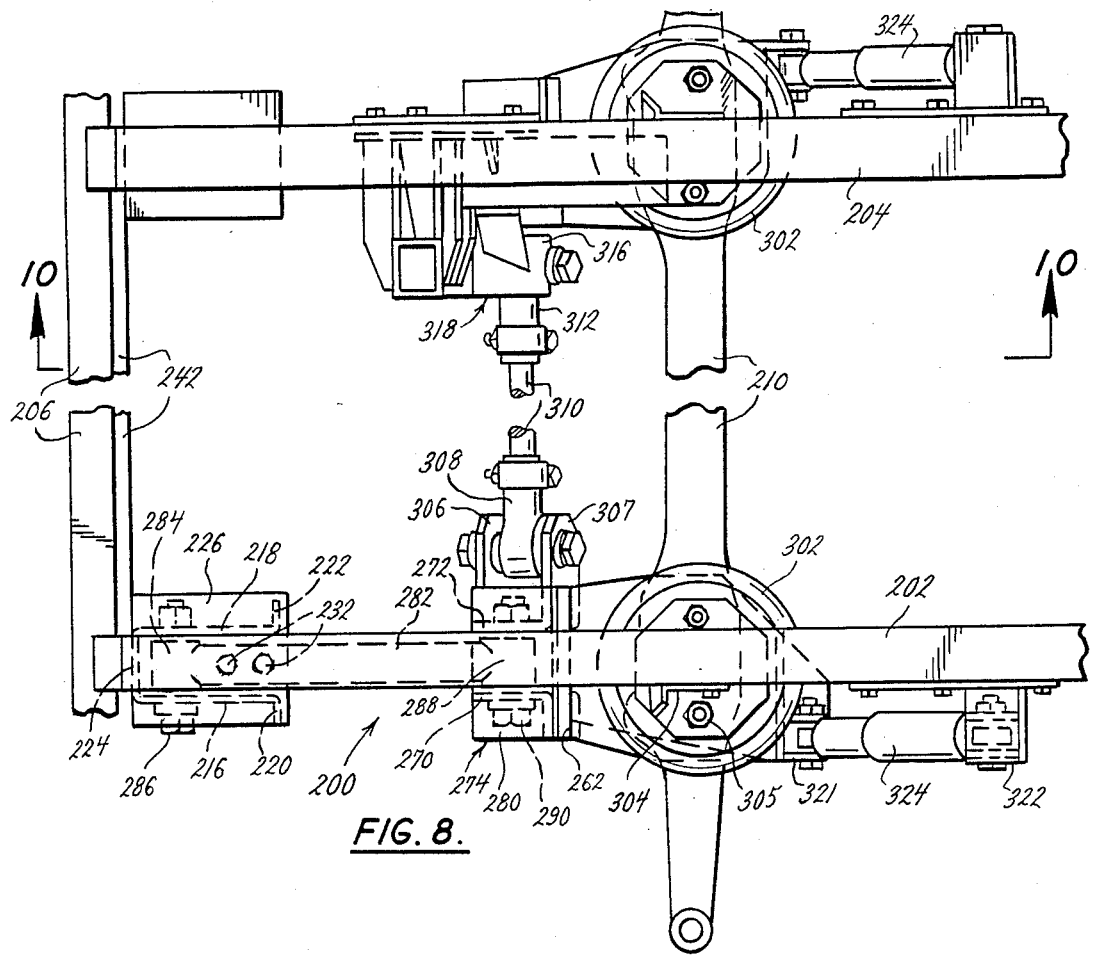
FIG. 8 is a top plan view of the suspension assembly of FIG. 7 with parts broken away.

In the suspension assembly 20 of FIGS. 1 through 7, the vehicle has left and right longitudinally extending side rail members 22 and 24 and has a steering axle 26. A cross channel member 27 extends between the side rail members 22 and 24 and is fastened by bolts 28 to a bracket 29 and to the side rail 22. Both sides of the vehicle have the same kind of suspension assembly and, where portions of the right side of the vehicle or suspension are referred to, the numbers used are the same as on the left side.

The suspension assembly includes a hanger 30 positioned directly below the cross channel member 27. The hanger 30 includes a top plate 32 that is fastened by bolts 34 that extend through the cross channel member 27 and a spacer plate 33 to the side rail member 22. The hanger 30 further includes a vertical channel member 36 having an outboard wall 38 and an inboard wall 40 joined at their forward edges by a transverse wall 42 and terminating at their rearward edges in narrow transverse forwardly inclined flanges 44 and 46, respectively. The vertical channel member 36 is welded to the top plate 32.

There are reinfrocing gussets including a gusset plate 48 that is inclined generally parallel to the flanges 44 and 46 and a gusset plate 50. Both the gusset plates 48 and 50 extend between the side walls 38 and 40 and downwardly from the top plate 32, but terminate to leave a necessary open space below them for connections to be described.

A bottom plate 52 is welded to the lower edges of the vertical channel member 36. As shown in FIG. 2, the top plate 32 and the bottom plate 52 extend inboard of the hanger 36 and the frame rail member 22, and a vertically extending gusset plate 54 is welded to the inner wall 40 and the top and bottom plates 52 and 54, extending inboard from the vertical channel member 36.

A symmetrical cross channel assembly 58 extends transversely between the hanger 30 and a like hanger depending from the other frame rail member 24. The cross channel assembly includes a channel member 60 to which a pair of generally triangular gusset plates 62 and 64 are welded. The gusset plates 62 and 64 have upper diagonal flanged edges 66 and 68, respectively. The channel member 60 is fastened by bolts 70 to the bottom plate 52, and the gusset plate 62 is fastened by bolts 72 to the vertical gusset plate 54.

An axle seat assembly 74 includes a bottom plate 76 that is connected by bolts 77 to the axle 26 and a top plate 78. The bottom and top plates 76 and 78 are joined by generally vertical plates such as the plates 80 and 82. The plates 76 and 78 have forwardly extending tongues 84 and 86 of substantially identical widths. Rearwardly, the tongue 84 terminates in a lateral plate edge 88 and the tongue 86 terminates in a lateral plate edge 90.

These configurations allow a torque rod bracket assembly 92 to be joined to and become an integral component with the axle seat assembly 74. The torque rod bracket assembly 92 includes two vertical plates 94 and 96 located on opposite sides of and welded to the two tongues 84 and 86. There are downwardly and rearwardly laterally outwardly inclined flanges 98 and 100 formed on the plates 94 and 96, respectively, and welded to the edges 88 and 90 of the bottom and top plates 76 and 78 of the axle seat assembly 74.

Above the upper axle seat plate 78, a cross plate 102 is welded to and extends between the flanges 98 and 100, and below the lower axle seat plate 76, a cross plate 104 is welded to and extends between the flanges 98 and 100. A pair of gusset plates 106 and 108 are welded to the lower spring seat plate 76 and the cross plate 104.

The top edges 110 of the plates 94 and 96 are generally horizontal, and a horizontal plate 112 is welded to these top edges 110. The plate 112 supports a resilient bumper 114.

A torque rod 116 extends between the hanger 30 and the bracket 92 and has a forward end 118 journalled in a bushing assembly 120 installed between the side plates 38 and 40 of the hanger 30, with a rearward end 122 mounted on a bushing assembly 124 that is installed between the side plates 94 and 96 of the bracket assembly 92. A lower torque rod 126 has a forward end 128 journalled on a bushing assembly 130 that is mounted between the plates 38 and 40 and a rearward end 132 journalled on a bushing assembly 134 mounted between the plates 94 and 96.

As viewed in FIG. 1, the axes of the bushings 124 and 134 are in an inclined plane. However, to maintain the true parallelogram, the torque rods 116 and 126 are of equal length and their forward ends 118 and 128 are mounted on bushing assemblies 120 and 130 that are in an inclined plane.

An upper spring bracket 138 is fastened by bolts 140 to the rail member 22 at a location directly above the axle 26. The upper side of an air spring 142 is connected to the bracket 138 by bolts 144 and to the upper plate 78 of the axle seat assembly 74 by bolts 146. This positions the air spring 142 directly above the axle 26. Even though the spring 142 is directly over the axle 26, because the parallogram bracket assembly 92 is inclined as viewed in FIG. 1, the size of the spring 142 can be varied without interference with that bracket assembly.

Mounted directly over the torque rod bracket assembly 92 are a pair of cross channel members 150 and 152 that extend transversely between the side frame rails 22 and 24, and are bolted to brackets 154 and 156 in turn bolted respectively to the side rail members 22 and 24.

A vertical column 158 is connected between the channel members 150 and 152 and extends downwardly to support a pair of connecting ears 160 and 162. An end 164 of a sway bar 166 is pivotally supported between the ears 160 and 162. The other end 168 of the sway bar 166 is pivotally supported in a bracket 170 that is welded to the torque rod support bracket 92. The sway bar 166 may have a turnbuckle type length adjustment and tightening device 172.

Extending rearwardly of the axle seat assembly 74 is a bracket 174. Another bracket 176 above the bracket 174 is bolted to the side rail member 22. A shock absorber 178 is connected to and extends between the brackets 174 and 176.

Another embodiment showing a suspension assembly 200 is illustrated in FIGS. 8 through 12. Here, the vehicle has chassis side rails 202 and 204 with a forward cross member 206 extending between them. At their forward ends, the side rails 202 and 204 each have a step-down section 208. The vehicle also has a steering axle 210.

A hanger assembly 212 comprises a vertical channel member 214 having outer and inner side walls 216 and 218 terminating in narrow flanges 220 and 222, respectively. The side walls 216 and 218 are joined at their forward edges by a front wall 224. The vertical channel 214 has a top plate 226 welded to it, and the forward wall 224 has a pair of forwardly extending plates 228 welded to it.

A cross plate 230 is welded to the front edges of the plates 228. The top plate 226 is fastened by bolts 232 to the side rail 208. A bracket 234 is fastened by bolts 236 to the plate 230 and by a bolt 238 extending through the side rail 208 and the cross member 206. Thus a rigid and yet removable connection is provided for the hanger 214.

A plate 240 is welded to the bottom of the vertical channel member 214. A cross channel member 242 is fastened by bolts 244 to the plate 240 and by a bolt 246 to the front wall 224 of the vertical channel member 214.

An axle seat assembly has generally parallel upper and lower plates 252 and 254 spaced close together by interconnecting vertical plates 256 and 258. The lower plate 254 is fastened by bolts 260 to the axle 210. The upper plate 252 has a forwardly extending tongue 260 terminating at lateral edges 262, and the lower plate 254 has a forwardly extending tongue 266 terminating at lateral edges 268. This enables the plates 252 and 254 to be welded between two vertical plates 270 and 272 that form the torque rod bracket 274.

As with the bracket assembly 92 already described, a plate 276 is welded across the flanged rear edges of the vertical plates 270 and 272, and a top plate 278 is welded across the top edges of the plates 270 and 272. A resilient bumper 280 is mounted on the plate 278.

Figure 7:
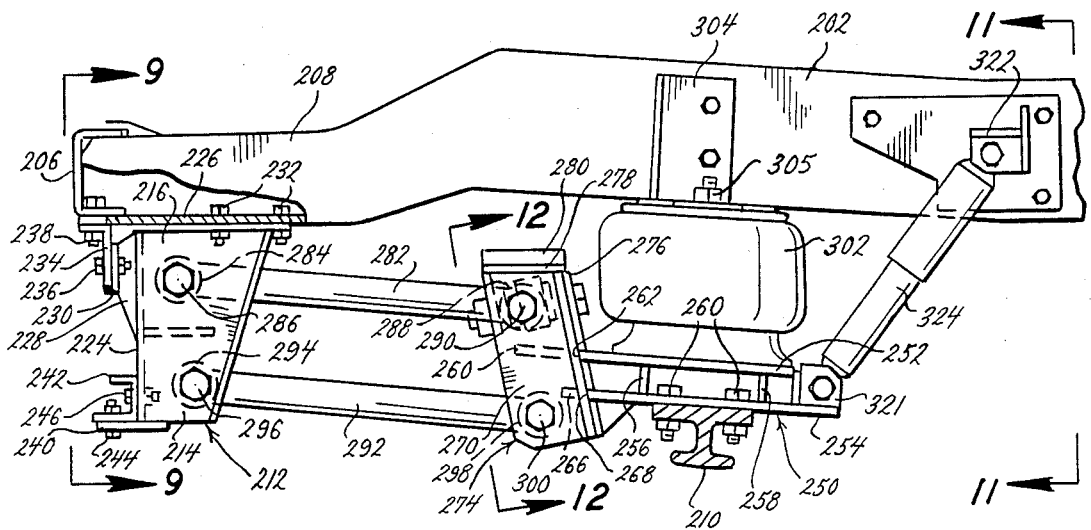
FIG. 7 is a side elevation view of a second embodiment of the suspension assembly of this invention.

An upper torque rod 282 has a forward end 284 journalled on a bushing 286 that is mounted in the hanger assembly 212, and a rearward end 288 is journalled on a bushing 290 mounted in the torque rod bracket 274. Likewise, a lower torque rod 292 has a forward end 294 journalled on a bushing 296 that is mounted in the hanger 216 and a rearward end 298 journalled on a bushing 300 that is mounted in the torque rod bracket assembly 274. The axes of the bushings 290 and 300 are in an inclined plane as shown in FIG. 7, and since the torque rods 280 and 292 are of equal length, the axes of the bushings 286 and 296 are likewise in an inclined plane. This provides space rearward of the bracket assembly 274 while retaining a true parallelogram arrangement.

An air spring 302 is mounted on the upper plate 252 of the axle seat assembly 250. A bracket 304 is connected to the side rail 204 and the upper side of the air spring 302 is fastened to the bracket 304 by bolts 305.

The torque rod bracket assembly 274 has a pair of inwardly extending ears 306 and 307 between which an end 308 of a sway bar 310 is mounted. The other end 312 of the sway bar is journalled between two plates 314 and 316 that are part of a sway bar bracket 318. The sway bar bracket 318 is fastened to the right side rail 204 by bolts 320.

The axle seat assembly 250 supports a pair of ears 321, and a shock absorber bracket 322 is bolted to the side rail 202. A shock absorber 324 is mounted between the ears 321 and to the bracket 322.

FIGS. 13 through 17 illustrate a suspension assembly 340 which represents a third embodiment of the invention. The suspension assembly 340 is installed on a vehicle that has a chassis with a left side rail 342, a right side rail 344, and a back-to-back cross channel assembly 346 welded between the side rails 342 and 344. Rearward there may be another cross channel member 348 welded between the side rails 342 and 344. The vehicle also has a steer axle 350.

The suspension assembly 340 incorporates a hanger assembly 354, an axle seat assembly 356, an air spring 358, and upper and lower torque rods 360 and 362, respectively. It will be understood that a like suspension assembly on the opposite side of the vehicle, like the suspension assembly 340, has similar components. Where some of those components are illustrated they are given the same numbers as appear on the suspension assembly 340.

Referring to the hanger assembly 354, as shown in FIGS. 13, 14 and 15, it includes a horizontal plate 364 welded to a vertical plate 366. A pair of bolts 368 connect the vertical plate 366 to the side rail 342, and another group of bolts 370 connect the bottom plate 364 to the cross channel member 346. The hanger assembly 354 also includes a transverse wall 372 that extends downwardly from the horizontal plate 364 and a pair of outboard vertical plates 374 and 376 are positioned outboard of the side rail 342 and project downwardly to support a lower bushing assembly 378. Inboard of the side rail 342, another pair of shorter longitudinal plates 380 and 382 depend downwardly from the horizontal plate 364 and support another bushing assembly 384. A cross channel member 386 is connected between the lower ends of the hanger assemblies 354 on opposite sides of the vehicle.

The axle seat assembly 356 includes upper and lower generally horizontal plates 388 and 390 with generally vertical plates 392, 394, 396 and 398 extending between them. The lower plate 390 is fastened to the axle 350 by a plurality of bolts 400. The air spring 358 is connected to the upper plate 388 and to a bracket 402 that is bolted to the side rail 342.

The axle seat assembly 356 includes a pair of inboard vertical plates that project above the upper generally horizontal plate 388. The plates 404 and 406 are aligned longitudinally with the hanger plates 380 and 382, and they support a bushing assembly 408. The axle seat assembly 356 also supports a pair of vertical plates 410 and 412 that project below the lower plate 390 and are aligned with the hanger plates 374 and 376. A bushing assembly 414 is supported between the plates 410 and 412.

The upper torque rod 360 has a forward end 416 journalled on the bushing assembly 384 and a rearward end 418 journalled on the bushing assembly 408. The lower torque rod 362 has a forward end 420 journalled on the bushing assembly 378 and a rearward end 422 journalled on the bushing assembly 414.

The axle seat assembly 356 also supports a sway bar mounting bracket 426. Another sway bar mounting bracket 428 is joined to the chassis adjacent the opposite side rail 344. A sway bar 430 is pivotally connected between the bracket 426 and the bracket 428 and finally, the axle seat assembly 356 supports a lower shock absorber mounting bracket 434. Another shock absorber mounting bracket 436 is supported by the chassis. A shock absorber 438 is mounted between the brackets 434 and 436.

Installation and Operation

It will be appreciated from the foregoing description that this suspension assembly is extremely compact. An integral axle seat and torque rod bracket is fabricated from components that are welded together to provide a rigid structure. A number of components are attached to the resulting integral axle seat and bracket assembly, including a single air spring located directly over the axle for maximum comfort, a shock absorber mounted between the axle seat assembly and the frame, a sway bar that is connected to the torque rod bracket to provide close proximity to the axle for lateral restraint, and two torque rods arranged in a parallelogram. The forward ends of the torque rods are pivotally mounted in a hanger and a cross channel assembly is connected between the hangers on opposite sides of the vehicle to make the installation very rigid.

For ease of assembly and disassembly, the integral parts are fastened to the vehicle chassis by bolts. Thus, assembly and disassembly for repair or access to other components of the vehicle is facilitated.

In operation, and referring to the embodiment of FIG. 1, the air spring 142 provides immediate response to vertical loads on the axle 26 because the air spring is located directly over the axle. The torque rods 116 and 126 transfer longitudinal forces between the hanger assembly 30 and the axle 26 by way of the bracket assembly 92 and the axle seat assembly 74. Because of the construction of the hanger assembly 30 together with the cross channel 60, these longitudinal loads are firmly resisted. Further strength is added by the cross member 28 extending between the side rails 22 and 24.

Since the parallelogram defined by the torque rods 116 and 126 is retained even though the planes of pivot of the torque rods are inclined, the axle 26 is prevented from rotating during all motions. Yet a large air spring 142 can be accommodated to improve the quality of the ride. The air spring 142 can omit the usual internal bumper because of the resilient bumper 114 mounted on the torque rod bracket assembly 92. The sway bar 172 provides lateral stability to the axle 26. Since the sway bar is connected to the torque rod bracket, it stabilizes the parallelogram as well as the axle through the integral torque rod bracket and axle seat assembly.

The operation of the embodiment shown in FIGS. 8 through 12 is similar to that just described and need not be re-described. Both suspension assemblies 20 and 200 provide the combination of stability and excellent ride qualities together with extreme compactness of design.

The suspension assembly 340 illustrated in FIGS. 13 through 17 provides parallelogram stabilization of the axle 350 in a longitudinal plane as with the previously described embodiments. Thus, the torque rods 360 and 362 maintain constant caster of the axle 350 as it moves vertically under applied load conditions.

In addition, however, a transverse parallelogram is also defined by the torque rods 360 and 362, as best seen in FIG. 14. This transverse parallelogram is established by the fact that the upper torque rod 360 is inboard relative to the lower torque rod 362. This transverse parallelogram stabilization gives greater axle stability against a tendency to wander left or right.

The construction of the hanger assembly 354 and the cross channel assembly 346 provides strength to the mounting of the inboard torque rod 360. This is because the hanger 354 is bolted to the cross beam 346 as well as to the side rail 342. In addition, the cross channel member 386 connected between the hanger assemblies 354 still further stabilizes the hanger assembly 354 and therefore the mounting of the torque rod 360.

There are various changes and modifications which may be made to the invention as would be apparent to those skilled in the art. However, these changes or modifications are included in the teaching of the disclosure, and it is intended that the invention be limited only by the scope of the claims appended hereto.

What I claim is:

1. In a vehicle having a chassis with left and right longitudinally extending rail members and an axle, a compact, readily removable suspension assembly comprising:

an axle seat, a torque rod bracket, and a sway bar bracket joined together as an integral unit having an upper plate and spaced generally vertical inboard and outboard side plates with means for connecting the generally vertical side plates to the upper plate, the sway bar bracket being on the inboard side of said integral unit, the upper plate having a forwardly extending tongue with side edges welded to the generally vertical side plates, means to connect the axle seat to the axle, an air spring having upper and lower sides, and releasable means to connect the upper plate to the lower side of the air spring, a spring mounting bracket connected to the chassis, and releasable means to connect the upper side of the air spring to the spring mounting bracket, a hanger depending from the chassis, upper and lower torque rods of equal length having first ends pivotally supported by the hanger at vertically spaced axes and second ends pivotally supported by and between the generally vertical side plates at vertically spaced axes, the space between the hanger support axes being substantially equal to the space between the torque rod bracket support axes, a sway bar having a first end and a second end, releasable means for pivotally connecting the first end of the sway bar to the sway bar bracket, and releasable means for pivotally supporting the second end of the sway bar from the chassis at an axis spaced transversely from the sway bar bracket.

2. The suspension assembly of claim 1 wherein the upper torque rod is spaced inboard relative to the lower torque rod.

3. The suspension assembly of claim 2 wherein the hanger is connected to the lower side of and depends downwardly and projects laterally outwardly from one side rail, a transverse beam connected to and extending between the side rails directly above the hanger, and means adjacent to and inboard of said one side rail for connecting the transverse beam to the hanger to stabilize the hanger inboard of the side rail to which it is connected.

4. The suspension assembly of claim 3 including a cross member connected between the hanger and a like hanger on the opposite side of the vehicle to further stabilize the hanger.

5. The suspension assembly of claim 1 wherein the upper plate has edges extending inboard and outboard of the tongue, and the generally vertical side plates have laterally extending flanges welded to said edges.

6. The suspension assembly of claim 5 wherein said integral unit has a lower plate with a forwardly extending tongue of the same width as the tongue on the upper plate and having side edges welded to the generally vertical side plates.

7. The suspension assembly of claim 6 wherein the lower plate has edges extending inboard and outboard of its tongue, and the flanges of the generally vertical side plates are welded to the edges of the lower plate.

8. The suspension assembly of claim 1 including a pair of spaced generally parallel members immediately above the sway bar and extending transversely between and connected to the side rails, a generally vertical post between and connected to the members and depending downwardly therefrom, a pair of spaced ears on the lower end of the post, the second end of the sway bar being positioned between and pivotally mounted to the ears.

9. The suspension assembly of claim 1 including a bracket supported by the rail opposite the suspension assembly, the second end of the sway bar being pivotally connected to the bracket.

10. The suspension assembly of claim 1 including a shock absorber bracket integral with said integral unit, a shock absorber, and releasable means for pivotally connecting the shock absorber between the chassis and the shock absorber bracket.

11. The suspension assembly of claim 1 including a resilient bumper mounted on top of the torque rod bracket, the bumper being directly beneath a side rail enabling elimination of an inner bumper on the air spring.

12. The suspension assembly of claim 1 wherein the upper torque rod is spaced inboard relative to the lower torque rod.

13. In a vehicle having a chassis with left and right longitudinally extending rail members and an axle, a compact, readily removable suspension assembly comprising:
   an axle seat, a torque rod bracket, and a sway bar bracket joined together as an integral unit having an upper plate and spaced generally vertical inboard and outboard side plates with means for connecting the generally vertical side plates to the upper plate, the sway bar bracket being on the inboard side of said integral unit,
   means to connect the axle seat to the axle,
   an air spring having upper and lower sides, and releasable means to connect the upper plate to the lower side of the air spring,
   a spring mounting bracket connected to the chassis, and releasable means to connect the upper side of the air spring to the spring mounting bracket,
   a hanger depending from the chassis,
   upper and lower torque rods of equal length having first ends pivotally supported by the hanger at vertically spaced axes and second ends pivotally supported by and between the generally vertical side plates at vertically spaced axes, the space between the hanger support axes being substantially equal to the space between the torque rod bracket support axes,
   a sway bar having a first end and a second end, releasable means for pivotally connecting the first end of the sway bar to the sway bar bracket, and releasable means for pivotally supporting the second end of the sway bar from the chassis at an axis spaced transversely from the sway bar bracket,
   the generally vertical side plates having rear edges terminating in laterally extending flanges, upper and lower transverse plates welded to the flanges, and gusset plates welded between the lower transverse plate and the lower axle seat plate.

14. The suspension assembly of claim 13 wherein the upper torque rod is spaced inboard relative to the lower torque rod.

* * * * *